United States Patent
Zheng et al.

(10) Patent No.: US 11,256,717 B2
(45) Date of Patent: Feb. 22, 2022

(54) STORAGE OF KEY-VALUE ENTRIES IN A DISTRIBUTED STORAGE SYSTEM

(71) Applicant: VMware, Inc., Palo Alto, CA (US)

(72) Inventors: Haoran Zheng, San Jose, CA (US); Wenguang Wang, Santa Clara, CA (US); Tao Xie, Shanghai (CN); Yizheng Chen, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 159 days.

(21) Appl. No.: 16/658,172

(22) Filed: Oct. 21, 2019

(65) Prior Publication Data

US 2021/0117443 A1 Apr. 22, 2021

(51) Int. Cl.
| | | |
|---|---|---|
| G06F 16/27 | (2019.01) | |
| G06F 3/06 | (2006.01) | |
| H04L 29/08 | (2006.01) | |
| G06F 11/20 | (2006.01) | |
| G06F 11/16 | (2006.01) | |
| G06F 16/182 | (2019.01) | |

(52) U.S. Cl.
CPC ............ *G06F 16/273* (2019.01); *G06F 3/067* (2013.01); *G06F 11/1662* (2013.01); *G06F 11/2094* (2013.01); *G06F 11/2097* (2013.01); *G06F 16/184* (2019.01); *G06F 16/275* (2019.01); *H04L 67/1095* (2013.01); *H04L 67/1097* (2013.01)

(58) Field of Classification Search
CPC ...... G06F 16/273; G06F 16/275; G06F 16/27; G06F 16/184; G06F 11/2097; G06F 11/1662; G06F 11/2094; G06F 3/067; H04L 67/1095; H04L 67/1097
See application file for complete search history.

(56) References Cited

U.S. PATENT DOCUMENTS

| | | | | |
|---|---|---|---|---|
| 6,148,083 | A * | 11/2000 | Fieres | G06F 21/602 380/255 |
| 7,953,890 | B1 * | 5/2011 | Katkar | G06F 11/2033 709/245 |
| 10,067,719 | B1 * | 9/2018 | Newman | G06F 11/2221 |
| 2012/0220282 | A1 * | 8/2012 | Kwon | H04W 4/023 455/418 |
| 2016/0299924 | A1 * | 10/2016 | Fujimoto | H04L 9/0822 |
| 2016/0342588 | A1 * | 11/2016 | Judd | G06F 16/137 |
| 2017/0187533 | A1 * | 6/2017 | Raj | H04L 9/12 |
| 2019/0065621 | A1 * | 2/2019 | Boles | G06F 16/22 |
| 2020/0192940 | A1 * | 6/2020 | Tomlinson | G06F 16/90348 |

\* cited by examiner

*Primary Examiner* — Etienne P Leroux
(74) *Attorney, Agent, or Firm* — Su IP Consulting (57) ABSTRACT

A distributed storage system, such as a distributed storage system in a virtualized computing environment, stores data in storage nodes as immutable key-value entries. A coordinator storage node creates a key-value entry and attempts to store the key-value entry in the coordinator storage node and in neighbor storage nodes. If the storage of the key-value entry in the in the coordinator storage node and in the neighbor storage node is successful, the coordinator storage node pushes the key-value entry to other storage nodes in the distributed storage system for storage as replicas.

21 Claims, 6 Drawing Sheets

STORAGE OF KEY-VALUE ENTRIES IN A DISTRIBUTED STORAGE SYSTEM

BACKGROUND

Unless otherwise indicated herein, the approaches described in this section are not admitted to be prior art by inclusion in this section.

Quorum-based consensus algorithms are often used to provide better consistency in distributed systems. For example, a distributed storage system may include a cluster of storage nodes such that the same piece of data is replicated in each storage node of the cluster. When the data is modified in one of the storage nodes, the modifications should be replicated in the other storage nodes so as to provide consistency in the data throughout the cluster. If a quorum-based consensus algorithm is implemented in the distributed storage system, the modification of the data in one of the storage nodes will first require a quorum of the other storage nodes to be available to implement the same modification and to provide permission to perform the modification.

There are several drawbacks with distributed storage systems that implement quorum-based consensus algorithms. First, due to the complexity of quorum-based consensus algorithms, significant effort is needed to build and test distributed storage systems that implement quorum-based consensus algorithms. Second, if there is an insufficient number of storage nodes to make a quorum, read/write access to the storage node(s) is not possible. Furthermore, quorum-based consensus algorithms typically operate based on a predefined number of replica storage nodes, and so it is difficult to scale the quorum-based consensus algorithms in/out based on the total number of storage nodes in a cluster.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks, by providing a distributed storage system that does not require a quorum of storage nodes to perform read/write operations. Data to be stored in the storage nodes of the distributed storage system are stored as immutable key-value entries that are not changeable. When the data is desired to be modified, a new key-value entry is created that will have a new key identification (key ID) and value corresponding to the updated/modified data, and that will be used instead of a previous key-value entry that has a different key ID and value that corresponds to the old/previous data.

A minimal set of storage nodes (of a cluster of storage nodes) to successfully store a key-value entry is first established. In operation, a coordinator storage node of the set receives a request to store data, and creates a key-value entry for the data to be stored and locally saves the key-value entry. The coordinator storage node then sends a request, to neighbor storage nodes of the set, to also save the key-value entry. If all of the coordinator and neighbor storage nodes are able to successfully store the key-value entry, then the coordinator storage node updates a state of the key-value entry to indicate an active state.

The coordinator storage node then pushes the key-value entry to the remaining storage nodes of the cluster, for storage in those storage nodes. Background synchronization may be used to ensure that replicas of the key-value entry are present in all of the storage nodes of the cluster. Any of the storage nodes may thereafter receive a query from a user to read the key-value entry, and the query may be serviced without requiring a quorum to perform the read operation (e.g., less than a quorum of storage nodes may be used to initiate read/write operations).

A removal process is also provided to remove key-value entries that are replaced by new key-value entries. The removal process may also remove key-value entries that fail to be stored by the minimal set of storage nodes during the initial storage process that was coordinated by the coordinator storage node.

Computing Environment

In some embodiments, the technology described herein may be implemented in distributed storage system provided in a virtualized computing environment. In other embodiments, the technology may be implemented in a storage system provided in other types of computing environments (which may not necessarily involve a virtualized computing environment), such as a storage system having clusters of physical storage devices that redundantly store data. For the sake of illustration and explanation, the various embodiments will be described below in the context of a distributed storage system provided in a virtualized computing environment.

Virtualization allows the abstraction and pooling of hardware resources to support virtual machines in a virtualized computing environment, such as a software-defined datacenter (SDDC). For example, through server virtualization, virtual machines running different operating systems may be supported by the same physical machine (e.g., referred to as a "host"). Each virtual machine may be generally provisioned with virtual resources to run an operating system and applications. The virtual resources may include central processing unit (CPU) resources, memory resources, storage resources, network resources, etc.

The storage resources are used by a virtual machine to store data relating to the operating system and applications run by the virtual machine. In a distributed storage system, storage resources of multiple hosts may be aggregated to form a shared pool of storage. Virtual machines supported by these hosts may then access the pool of storage to store data. According to one embodiment, the methodologies described herein for creating, querying, and removing key-value entries may be applied to such a distributed storage system in a virtualized computing environment.

Various implementations will now be explained in more detail using FIG. 1, which is a schematic diagram illustrating an example virtualized computing environment 100 that can provide distributed storage functionality. Depending on the desired implementation, virtualized computing environment 100 may include additional and/or alternative components than that shown in FIG. 1.

Figure 1:
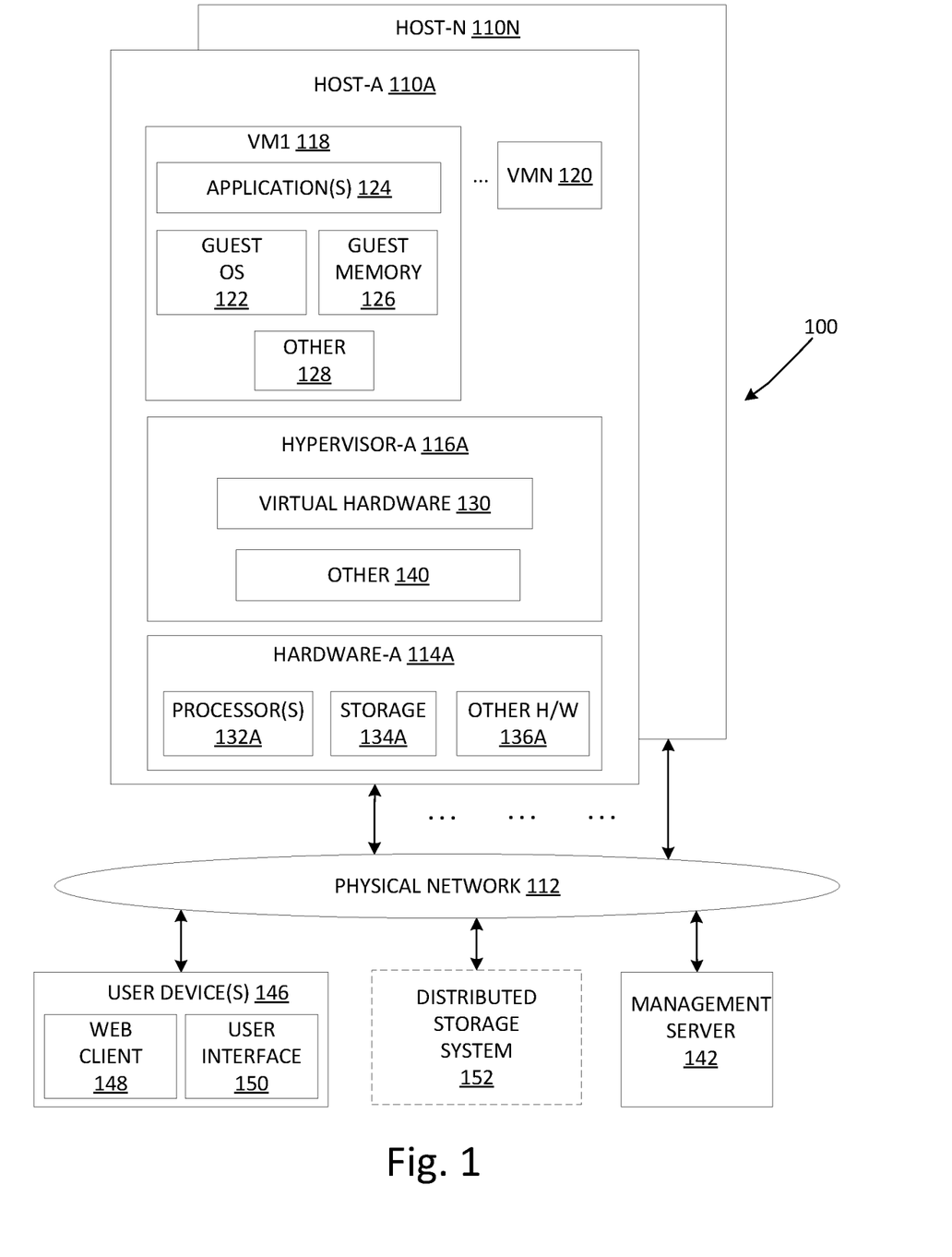
FIG. 1 is a schematic diagram illustrating an example virtualized computing environment having a distributed storage system that implements a method to store data using key-value entries.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. The interconnected hosts may in turn communicate with each other in a unicast or multicast manner. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 is shown and described herein.

VM1 118 may include a guest operating system (OS) 122 and one or more guest applications 124 (and their corresponding processes) that run on top of the guest operating system 122. VM1 118 may also include a guest memory 126 for use by the guest operating system 122 and/or for other storage purposes. VM1 118 may include still further other elements, generally depicted at 128, such as a virtual disk and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A may include still further other elements, generally depicted at 140, such as a virtual switch, agent(s), etc.

Hardware-A 114A in turn includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 (e.g., Microsoft Word, Microsoft Excel, etc.) in VM1 118. Corresponding to the hardware-A 114A, the virtual hardware 130 may include a virtual CPU, a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A distributed storage system 152 may be connected to each of the host-A 110A . . . host-N 110N that belong to the same cluster of hosts. For example, the physical network 112 may support physical and logical/virtual connections between the host-A 110A . . . host-N 110N, such that their respective local storage resources (such as the storage resource 134A of the host-A 110A and the corresponding storage resource of each of the other hosts) can be aggregated together to form the distributed storage system 152 that is accessible to and shared by each of the host-A 110A . . . host-N 110N. In this manner, the distributed storage system 152 is shown in broken lines in FIG. 1, so as to symbolically convey that the distributed storage system 152 is formed as a virtual/logical arrangement of the physical storage devices (e.g. the storage resource 134A of host-A 110A) located in the host-A 110A . . . host-N 110N. However, in addition to these storage resources, the distributed storage system 152 may also include stand-alone storage devices that may not necessarily be a part of or located in any particular host.

A management server 142 or other management entity of one embodiment can take the form of a physical computer with functionality to manage or otherwise control the operation of host-A 110A . . . host-N 110N, including operations associated with the distributed storage system 152. In some embodiments, the functionality of the management server 142 can be implemented in a virtual appliance, for example in the form of a single-purpose VM that may be run on one of the hosts in a cluster or on a host that is not in the cluster of hosts. The management server 142 may be operable to collect usage data associated with the hosts and VMs, to configure and provision VMs, to activate or shut down VMs, to monitor health conditions and diagnose and remedy operational issues that pertain to health, and to perform other managerial tasks associated with the operation and use of the various elements in the virtualized computing environment 100 (including managing the operation of the distributed storage system 152). In one embodiment, the management server 142 may be configured to manage the data stored in the distributed storage system 152 as immutable key-value pairs, as will be explained further below.

The management server 142 may be a physical computer that provides a management console and other tools that are directly or remotely accessible to a system administrator or other user. The management server 142 may be communicatively coupled to host-A 110A ... host-N 110N (and hence communicatively coupled to the virtual machines, hypervisors, hardware, distributed storage system 152, etc.) via the physical network 112. The host-A 110A ... host-N 110N may in turn be configured as a datacenter that is also managed by the management server 142. In some embodiments, the functionality of the management server 142 may be implemented in any of host-A 110A ... host-N 110N, instead of being provided as a separate standalone device such as depicted in FIG. 1.

A user may operate a user device 146 to access, via the physical network 112, the functionality of VM1 118 ... VMN 120 (including operating the applications 124), using a web client 148. The user device 146 can be in the form of a computer, including desktop computers and portable computers (such as laptops and smart phones). In one embodiment, the user may be a system administrator that also uses the web client 148 of the user device 146 to remotely communicate with the management server 142 for purposes of performing operations such as configuring, managing, diagnosing, remediating, etc. for the VMs and hosts (including the distributed storage system 152). The user may also be any general user, such as a consumer that is using the services (e.g., the application 124) provided by VM1 118.

The user device 146 may also include a user interface 150. The user interface 150 may comprise part of the web client 148 (e.g., a web-based user interface), or may be external to the web client 148 (such as a user interface that is provided by some other application installed in the user device 146 and which can communicate with the web client 148). When the user is a system administrator, the user may use the web client 148 and the user interface 150 to communicate with the management server 142 for managing the virtualized computing environment 100. When the user is a consumer of services provided by the virtualized computing environment, the user may use the web client 148 and the user interface 150 to use the applications 124, etc.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Distributed Storage System

Figure 2:
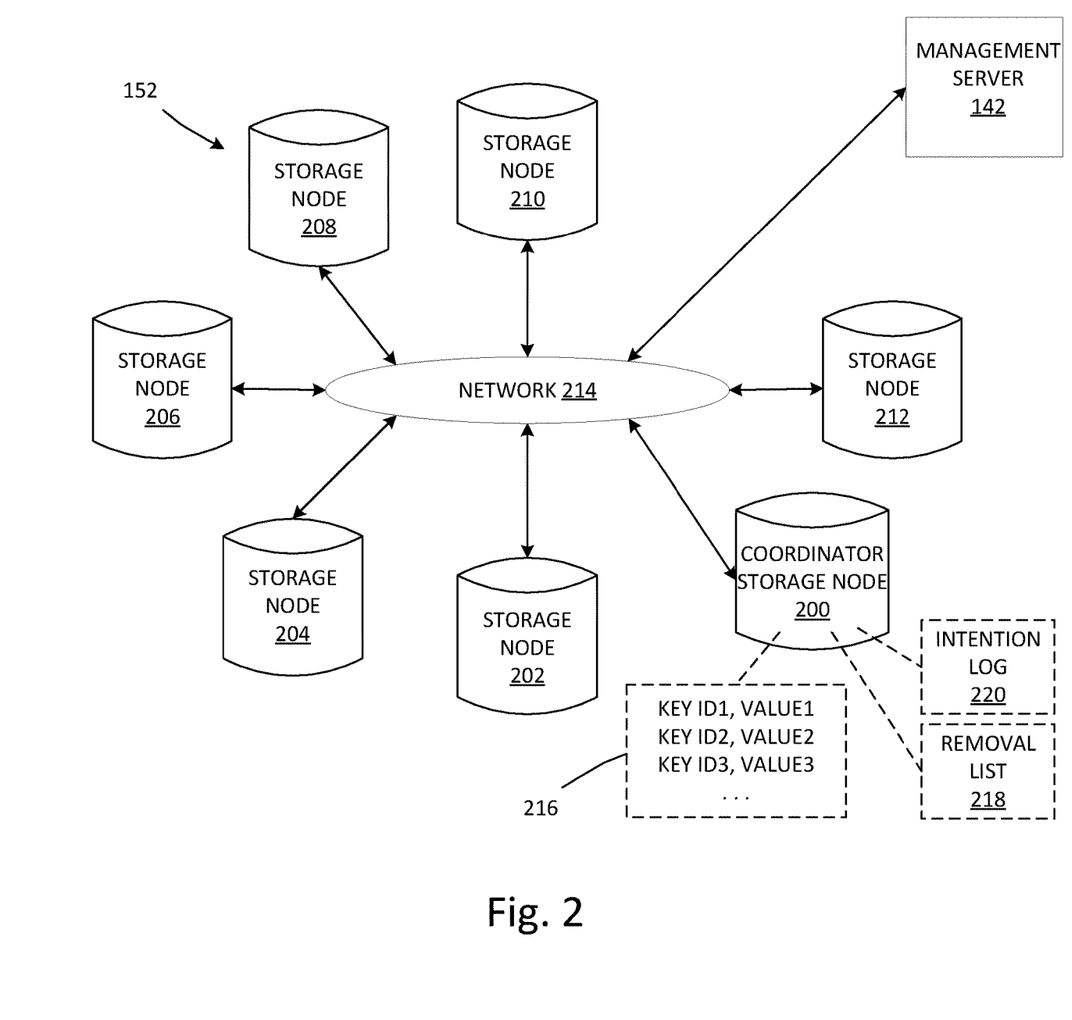
FIG. 2 is a schematic diagram illustrating further details of the distributed storage system of FIG. 1.

FIG. 2 is a schematic diagram illustrating further details of the distributed storage system 152 of FIG. 1. Specifically, FIG. 2 diagrammatically represents a cluster of storage nodes 200-212 in the distributed storage system 152. As previously explained above with respect to FIG. 1, the various storage locations in the distributed storage system 152 may be provided by aggregating the respective physical storage resources of the hosts in FIG. 1. Thus, for example, the storage node 202 may be a virtual storage node that is formed by aggregating the storage resource 134A (or portion thereof) of host-A 110A and the storage resource (or portion thereof) of some other host(s). The other storage nodes 204, 206, 208, etc. may also be virtual storage nodes that are provided by aggregating storage resources (or portions thereof) of the various hosts in the virtualized computing environment 100. Also, some of the storage nodes 200-212 may be a physical storage node in the form of a standalone storage device, rather than being a virtual storage node that is provided by way of an aggregation of storage resources.

The storage nodes 200-212 may communicate with each other via a network 214. The network 214 may be a physical network (wired or wireless) or a logical network, which are provided/supported through the physical network 112 or other network/connections. The management server 142 can communicate with any of the storage nodes 200-212 via the network 214, in order to perform management operations for the distributed storage system 152.

Each of the storage nodes 200-212 stores data associated with operating the virtual machines of the virtualized computing environment 100. This data may include data used or generated by the applications 124 or by the operating system(s), data that is uploaded to the distributed storage system 152 by a user, system/network health and performance data, and so forth. When the data is current and consistent, each of the storage nodes 200-212 will store the same data (e.g., the data is replicated in each of the storage nodes 200-212).

In one embodiment, the data stored in each of the storage nodes 200-212 may be organized as key-value entries. Generally, a key-value entry (sometimes referred to interchangeably as simply a key, or as a key-value pair) contains two parts: a key identification (ID) and a value. The key ID may be a pointer or other reference that uniquely identifies the corresponding value, and the value is the data itself (whether a single piece of data, or multiple pieces of data). In the example of FIG. 2, the storage node 200 (labeled as a coordinator storage node, for reasons that will be explained later below) stores key-value entries 216, which includes the key-value pairs: KEY ID1, VALUE1; KEY ID2, VALUE2; KEY ID3, VALUE3; etc. When there is consistency amongst the storage nodes 200-212, all of the storage nodes have the same key-value entries 216 stored therein. For the sake of clarity and to avoid clutter, the key-value entries 216 for only the storage node 200 is shown in FIG. 2.

According to one embodiment, the management server 142 manages all (or most) of the key-value entries 216 as immutable data entries. Thus, after a data entry is created/stored (for example, generated by the application 124), the stored data entry is not modified. That is, after a particular key ID is created, the key ID as well as its corresponding value are not changed. If the application 124 or other component needs to later change the key-value pair (e.g., needs to update or replace the previously stored data), a new key-value pair (with a new key ID) is created to be used/stored instead of modifying the previous key-value pair. The previous key-value pair can then be removed/deleted in due course.

Key-Value Entries: Creation, Query, and Removal in the Distributed Storage System To better understand the features and operations of the distributed storage system 152 in connection with data storage using key-value entries, reference is made next to FIGS. 3-6, which will be described in conjunction with continued reference to FIG. 2. The distributed storage system 152 of one embodiment is configured to support at least three operations:

Key creation: a user (e.g., the application 124) provides a value to the distributed storage system 152, and the distributed storage system 152 creates a new key-value entry with a key ID associated with the provided value. This operation is a write operation that writes data (the value) to a storage node.

Key query: the user (e.g., the application 124) provides the key ID in a query to the distributed storage system 152, and the distributed storage system 152 will use the key ID to look at the key-value entries and will return the value that corresponds to the key ID, if the key-value entry is located. This operation is a read operation to access the data (the value) from a storage node.

Key removal: the user (e.g., the application 124) or some other element in the virtualized computing environment 100 provides a key ID to the distributed storage system 152, and the distributed storage system 152 will remove the key-value entry if located. This operation is associated with removing/deleting stale/inconsistent data that has been replaced by a new key-value entry.

Each of the above and related operations will be described next below. In one embodiment, there is no "modify" operation. That is, a new key ID and value is created that corresponds to new/updated data, and the previous (different) key ID and value for the old/previous data may be removed.

Figure 3:
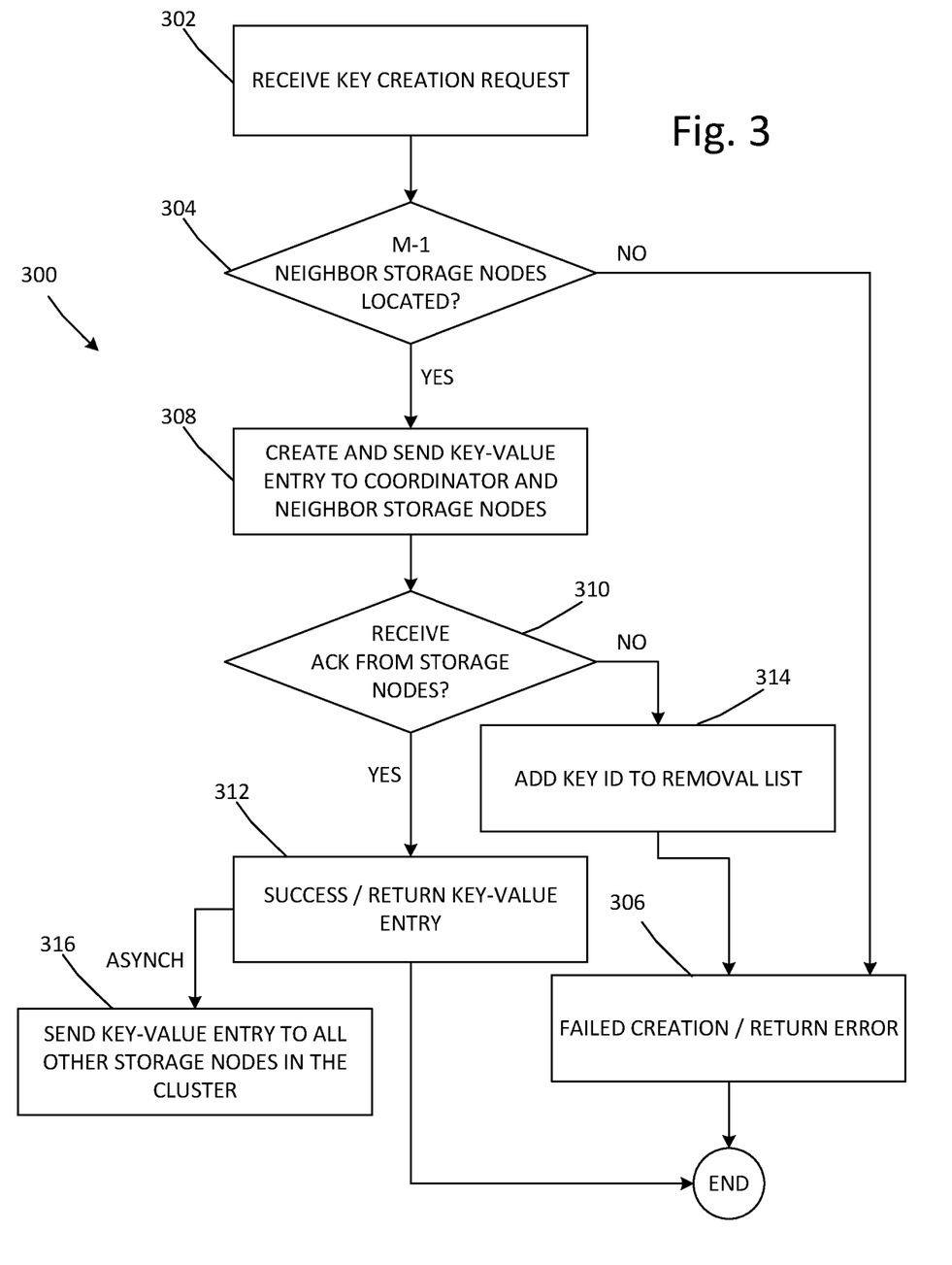
FIG. 3 is a flowchart of an example method for key creation that can be used in the distributed storage system of FIG. 2.

FIG. 3 is a flowchart of an example method 300 for key creation that can be used in the distributed storage system 152 of FIG. 2. The method 300 can be implemented in the virtualized computing environment 100 in one embodiment. The example method 300 may include one or more operations, functions, or actions illustrated by one or more blocks, such as blocks 302 to 316. The various blocks of the method 300 and/or of any other process(es) described herein may be combined into fewer blocks, divided into additional blocks, supplemented with further blocks, and/or eliminated based upon the desired implementation. In one embodiment, the operations of the method 300 and/or of any other process(es) described herein may be performed in a pipelined sequential manner. In other embodiments, some operations may be performed out-of-order, in parallel, etc.

The method 300 may begin at a block 302 ("RECEIVE KEY CREATION REQUEST"), wherein any one of the storage nodes 200-212 receives a key creation request from the user (e.g., the application 124). The key creation request may be, for example, in the form of a request to write data to the distributed storage system 152 (with the request being accompanied by the data itself that is to-be-written). The storage node that receives the key creation request can be designated as the coordinator storage node, which in FIG. 2 is the storage node 200. Any of the storage nodes 200-212 may receive the request, and the recipient storage node is designated as the coordinator storage node.

Next at a block 304 ("M−1 NEIGHBOR STORAGE NODES LOCATED?"), the coordinator storage node attempts to located M−1 neighbor storage nodes that are alive/operational. The number M may be defined as a minimum number of storage nodes that are required in order to have the data successfully replicated in the distributed storage system 152. In one embodiment, a distributed storage system with more than three storage nodes can use M=3 as the required minimum number of storage nodes (e.g., a set of three storage nodes). Thus, if M=3 and since the coordinator storage node (e.g. the storage node 200) counts as one of the storage nodes of the set that needs to coordinate with M−1 neighbors and itself to write the new key-value pair, then the coordinator storage node needs to locate M−1=2 neighbor storage nodes.

It is noted that the value of M will often be less than what would be a quorum number in storage systems that use quorum-based consensus algorithms. For instance, the distributed storage system 152 may have 10, 100, 1000, etc. storage nodes, but M=3 storage nodes will be sufficient in one embodiment to provide successful replication of data in most or all of the storage nodes.

In the example of FIG. 2, the two neighbor storage nodes for the coordinator storage node (e.g., the storage node 200) may be the storage node 202 and the storage node 212. Since the storage nodes 200-212 are virtual storage nodes in one embodiment, a neighbor storage node is not necessarily intended to encompass a storage node that is in any sort of physical proximity to the coordinator storage node. The neighbor storage nodes may be any storage nodes in the cluster of nodes that are operational and that are selected by the coordinator storage node to be the neighbor storage nodes.

If the coordinator storage node is unable to find M−1 neighbor storage nodes (e.g., "NO" at the block 304, then the method 300 proceeds to a block 306 ("FAILED CREATION/RETURN ERROR"), wherein the coordinator storage node sends an error message to the requesting user (e.g., the application 124), informing the user that the coordinator storage node failed to create a key-value entry and so there was an error in storing the data.

If, however, the coordinator storage node is able to locate the M−1 neighbor storage nodes ("YES" at the block 304), then the coordinator storage node creates the key-value entry and sends the key-value entry to itself and to the M−1 neighbor storage nodes, at a block 308 ("CREATE AND SEND KEY-VALUE ENTRY TO COORDINATOR AND NEIGHBOR STORAGE NODES"). In one embodiment, the coordinator storage node generates the key ID portion of the key-value entry by using a universally unique identifier (UUID) as the key ID. A UUID is used in such embodiment so that there will be no key ID collisions/duplicates when other key-value entries (for other data) are being created in parallel by multiple storage nodes. The coordinator storage node associates the generated key ID to the value (received data from the user) to create the key-value entry, and sends the created key-value entry locally to its memory and sends the created key-value entry to the M−1 neighbor storage nodes (e.g., the storage nodes 202 and 212).

In some embodiments, the key-value entry is sent to the M−1 neighbor storage nodes and internally to the memory of the coordinator storage node in the form of a preparation request. The storage nodes that receive the preparation request will try to save (store) the key-value entry and send an acknowledgement (ACK) to the coordinator storage node if the key-value entry is successfully saved.

At a block 310 ("RECEIVE ACK FROM STORAGE NODES?"), the coordinator storage node collects the ACKs from the neighbor storage nodes (and also from itself). If all of the ACKs are received from the storage nodes ("YES" at the block 310), then this indicates that the key-value entry was successfully written to the coordinator storage node and to the neighbor storage nodes (e.g., a required minimum number of storage nodes were able to satisfy the request to write/store the data).

At a block 312 ("SUCCESS/RETURN KEY-VALUE ENTRY"), the coordinator storage node marks the created key-value entry as active, so as to indicate that the key-value entry is active and current. The coordinator storage node sends this update of the state (to active status) to itself, and also sends the key-value entry to the user that originated the key creation request at the block 302, so as to enable the user to know which key to provide for future access (e.g., a read operation) to the stored data. The coordinator storage node also sends the state change (to active status) to the M−1 neighbor storage nodes, so that these neighbor storage nodes can also mark their locally stored key-value entry as active.

If, back at the block 310, the coordinator storage node does not receive all of the ACKs from the M−1 storage nodes and from itself ("NO" at the block 310), then such a situation indicates that these storage nodes have not written the key-value entry into their local memory. Accordingly, the required minimum number M storage nodes for successful replication is not met. In this situation, the key-value entry has only been partially written into the required M storage nodes (or has not been written successfully into any of them), and should be discarded in favor of a retry to create a new key-value entry for the same data. The coordinator storage node adds the key ID of the unsuccessful key-value entry to a removal list 218 (shown in FIG. 2) that is maintained by the coordinator storage node, at a block 314 ("ADD KEY ID TO REMOVAL LIST").

Further details regarding operations associated with the removal list 218 in block 314 will be provided later below with respect to FIG. 5. Generally speaking, the placement of the key ID into the removal list 218 enables other storage nodes (which may have written the key-value entry locally to their memory and which have access to the removal list 218), enables these other storage nodes to identify and delete their local copy of the unsuccessful key-value entry. Deletion of the local copy is beneficial, so as to avoid data inaccuracies/mismatches if the same key ID is used later for some other (different) data. Moreover, the placement of the key ID in the removal list 218 enables the management server 142 to recycle the key IDs for future data, thereby avoiding the need to generate an extremely large number of key IDs for data—the key IDs associated with unsuccessful key-value entries can be recycled for use for other data, so long as the unsuccessful key-value entries are removed from the storage nodes 200-212 prior to recycling.

At a block 316 ("SEND KEY-VALUE ENTRY TO ALL OTHER STORAGE NODES IN THE CLUSTER"), the successfully created key-value entry is sent to all of the remaining storage nodes (e.g., storage nodes 204-210 in FIG. 2) in the cluster, so that (ideally) all of the storage nodes 200-212 in the cluster will contain replicas of the data. Having replicas of the data in all of the storage nodes 200-212 provides maximum availability for the data, since the user can obtain the data by accessing any of the storage nodes.

In one embodiment, the key-value entry is pushed to the remaining storage nodes in an asynchronous manner. The coordinator may perform all of the pushing of the key-value entry to the remaining storage nodes for storage. It is also possible for some of the M−1 neighbor storage nodes to perform the pushing of the key-value entry, alternatively or additionally to the coordinator storage node. Still further, any of the other storage nodes (e.g., the storage node 204), which had received the key-value entry from the coordinator storage node or from one of the M−1 neighbor storage node, can push the key-value entry to any of the remaining storage nodes for storage therein. In this manner, the key-value entry propagates through the distributed storage system for storage.

It is noted that at any of the blocks 302-316, the coordinator storage node could fail (e.g., due to a power outage, etc.). According to one embodiment, the coordinator storage node could write to an intention log 220 (shown in FIG. 2) as the various operations in the method 300 are completed, so that the coordinator storage node will be able to determine where to resume the method 300 after recovering from the failure. Thus, every time the coordinator storage node sends a request, receives a response/ACK, updates a state of a key-value entry, etc., the coordinator storage node updates the intention log 220 to indicate that these tasks have been completed.

For instance, if the coordinator storage node fails before the removal list 218 is updated at the block 314 to add a partially completed key, the coordinator storage node will (after recovering from the failure) determine that it (the coordinator storage node) is the owner of a prepared key-value pair in its local memory, and that less than M responses to the preparation request have been received from the neighbor storage nodes and that the key ID has not yet been added to the removal list 218. The coordinator storage node will thus be able to add the key ID to the removal list 218 so as to continue the removal of the partially completed key.

In one embodiment, the intention log 220 of each of the storage nodes 200-212 may be stored at the respective storage node for local access. Alternatively or additionally, the intention log 220 for each of the storage nodes 200-212 may be stored and maintained at the management server 142.

The use of the management server 142 for maintaining the intention logs 220 or other status information for the storage nodes 200-212 and for the key value entries 216, may be beneficial in other ways. For instance, a prepared key-value entry can serve key query requests, but eventually, the key-value entry should be marked either as active or removed. A storage node can also learn from a background synchronization (discussed further below) to mark its local prepared key-value entry as active or removed. However, there may be some situations when the coordinator storage node fails and is then removed from the cluster before the coordinator storage node is able to send out requests to the other storage nodes to update their key status—a result is that the key may remain permanently active in the other storage nodes. Leveraging the management server 142 to monitor key status and to also send out update requests, enables the other storage nodes to mark their locally stored key-value entry as removed.

As previously explained above for the block 316 of the method 300, the prepared key-value entry may be sent to the remaining storage nodes in an asynchronous manner. However, there are some situation when this key replication may not be able to complete, due to network downtime, storage partitions, etc. Accordingly, one embodiment provides a background synchronization process that may run periodically to make sure that all of the storage nodes in the cluster have their key-value entries in synchronization, in the event that there is some lag or delay in the completion of the asynchronous replication, thereby compensating for the lag/delay.

Figure 4:
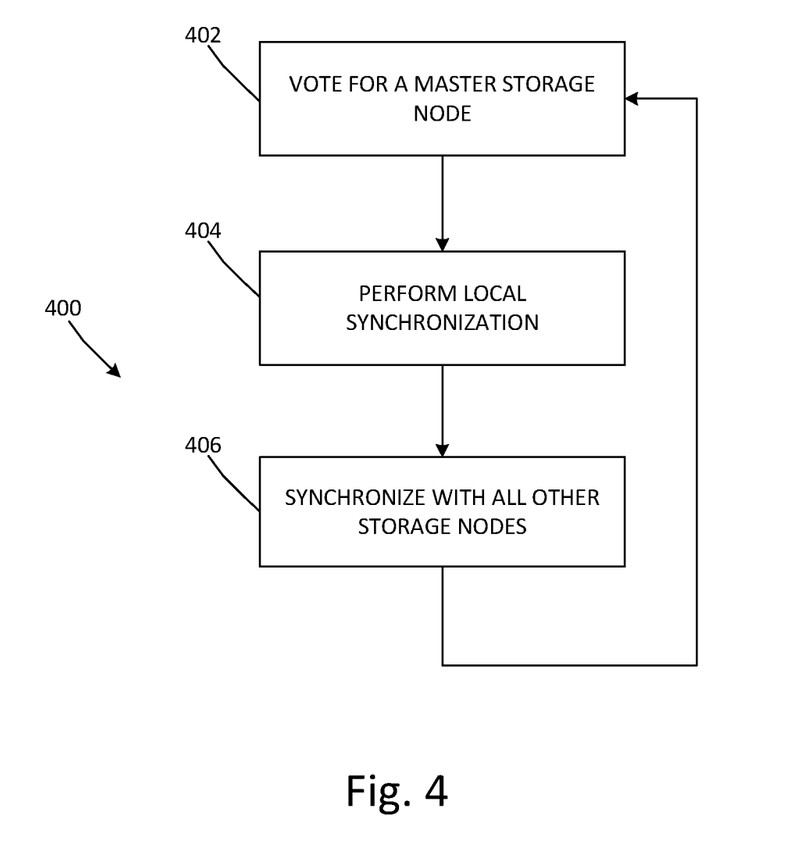
FIG. 4 is a flowchart of an example method for background synchronization that can be used in the distributed storage system of FIG. 2.

FIG. 4 is a flowchart of an example method 400 for background synchronization that can be used in the distributed storage system 152 of FIG. 2. At a block 402 ("VOTE FOR A MASTER STORAGE NODE"), the storage nodes 200-212 vote for a master storage node that will coordinate the synchronization. The master storage node need not be the same storage node as the coordinator storage node.

At a block 404 ("PERFORM LOCAL SYNCHRONIZATION"), the master storage node adds any missing key-value entries, if any, to its local memory. The master storage node may also place the key IDs of any unsuccessfully created key-value entries into its removal list 218, and then removes such key-value entries from its own local memory if present. According to one embodiment, the master storage node may be able to determine which key-value entries to store locally and which to place on the removal list and then remove from its own memory, by comparing the stored key-value entries and removal lists of the other storage nodes in the cluster and identifying discrepancies as the key-value entries to add/remove.

Next at a block 406 ("SYNCHRONIZE WITH ALL OTHER STORAGE NODES"), the master storage node pushes synchronization requests to any of the storage nodes that require synchronization. For example, storage nodes that are missing certain key-value entries are provided with such key-value entries by the master node. Furthermore, the master storage node may broadcast the contents of its removal list 218 (such as broadcasting one or more key IDs) to the other storage nodes so that these storage nodes may update their own removal lists and then remove their locally stored key-value entries that match the contents of the removal list 218 from the master storage node.

After the block 406 is completed, a time delay interval passes, before the method 400 returns again to the block 402 to select a master node to coordinate the next round of synchronization.

Figure 5:
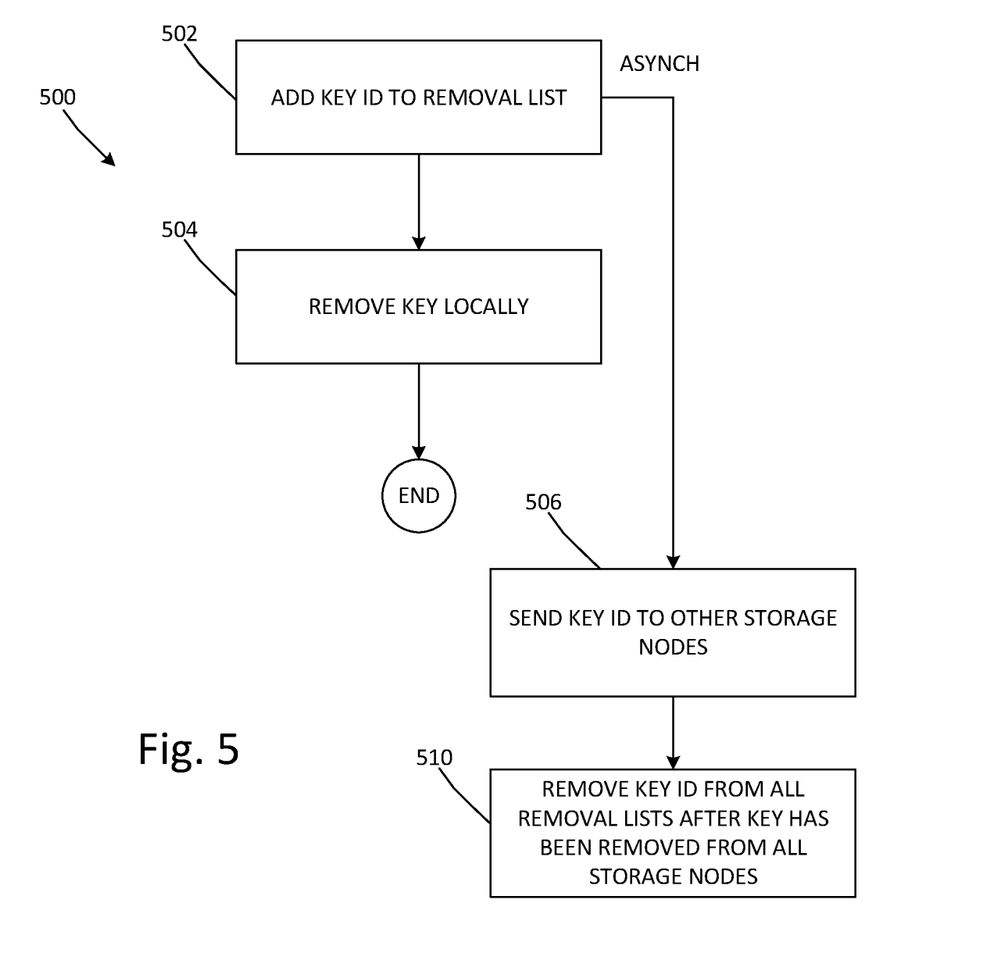
FIG. 5 is a flowchart of an example method for key removal that can be used in the distributed storage system of FIG. 2.

FIG. 5 is a flowchart of an example method 500 for key removal that can be used in the distributed storage system 152 of FIG. 2. The method 500 may be based on the operations performed at the block 314 in FIG. 3, wherein unsuccessfully created keys are placed on the removal list 218 of each storage node. The method 500 may also be used to remove keys that are no longer in active status, such as keys that correspond to stale data that has been replaced with new key-value entries having new key IDs and values.

At a block 502 ("ADD KEY ID TO REMOVAL LIST"), one of the storage nodes adds a key ID to its removal list 218. At a block 504 ("REMOVE KEY LOCALLY"), that storage node removes/deletes the corresponding content from its local storage, if that content is present. In one embodiment, the removal involves a removal of just the key ID from the local storage, thereby leaving the corresponding value orphaned and inaccessible. In another embodiment, both the key ID and the value are removed (e.g., the entire key-value entry is removed).

When the key ID has been added to the removal list 218 at the block 502 or when the key ID is deleted locally at the block 504, the storage node may broadcast its removal list 218 or the removed key ID to the other storage nodes in the cluster. For example at a block 506 ("SEND KEY ID TO OTHER STORAGE NODES"), the storage node may asynchronously send its removal list 218, having a new key ID for the removed key contained therein, to neighbor storage nodes and other storage nodes in the cluster. The other storage nodes will then detect the presence of the new key ID in the removal list 218, and will remove their locally stored key-value entry corresponding to the key ID, if present. The other storage node(s) will also update their own removal list 218 to include the key ID, if not yet included in their own removal list.

The removal list 218 can potentially become quite large. It may be beneficial to keep the size of the removal list 218 at a reasonably manageable length. For example, if a key ID has been removed from all storage nodes, then there is no reason to keep that key ID listed the removal list 218. Keeping the key ID in the removal list, after the key ID has been removed from all of the storage nodes, results in a removal list 218 that would take more time to process/examine for new key ID entries, due to the unnecessary information contained in the lengthy removal list 218. Moreover, key IDs that remain listed in the removal list would not be able to be beneficially recycled for use in new key-value entries.

Accordingly at a block 510 ("REMOVE KEY ID FROM ALL REMOVAL LISTS AFTER KEY HAS BEEN REMOVED FROM ALL STORAGE NODES"), the management server 142 may be used to inspect all storage nodes, and to remove a key ID from the removal list 218 of all storage nodes, after the management server 142 confirms that the key-value entry has been deleted from all storage nodes.

Figure 6:
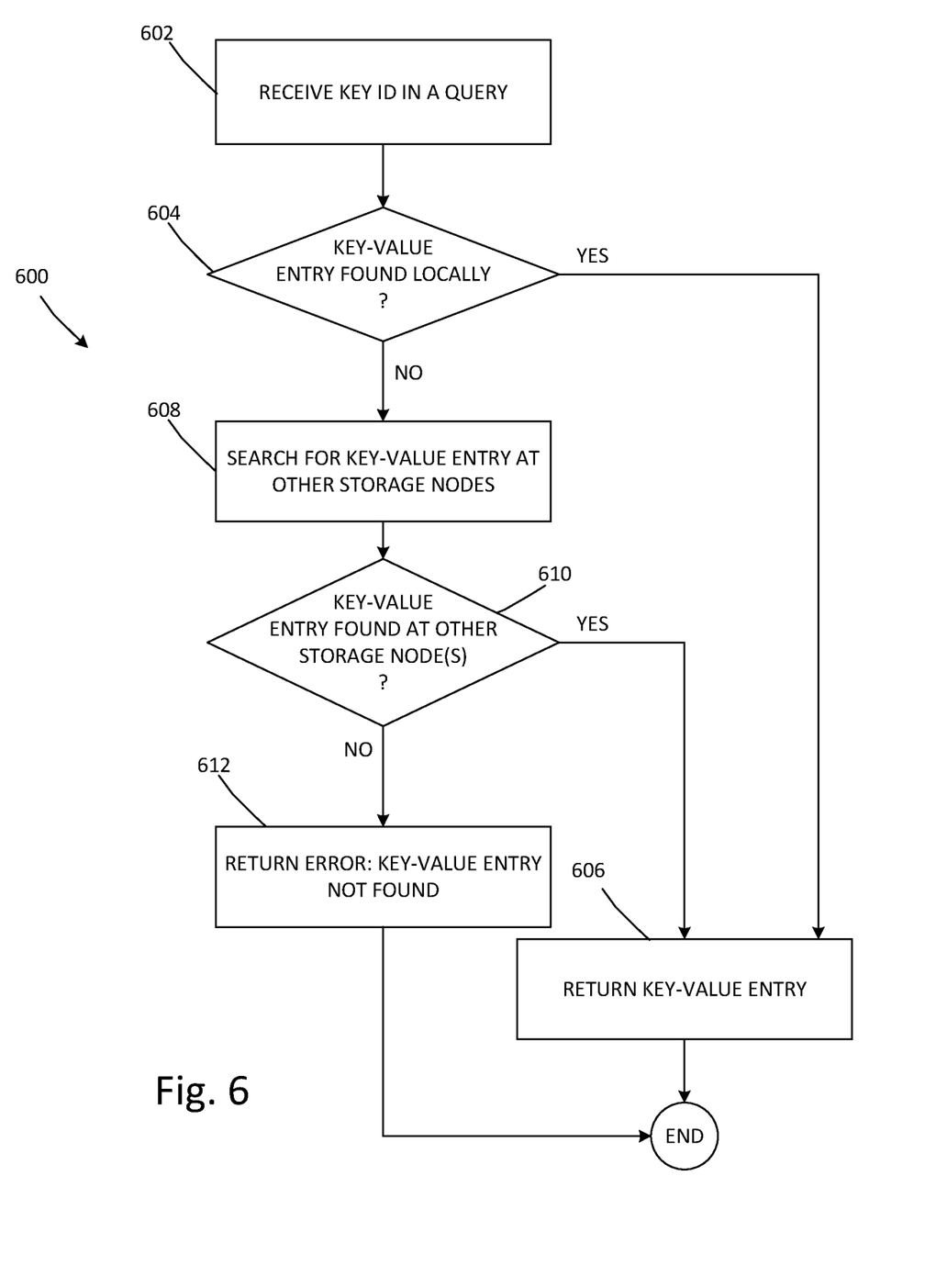
FIG. 6 is a flowchart of an example method for a key query that can be used in the distributed storage system of FIG. 2.

FIG. 6 is a flowchart of an example method 600 for a key query that can be used in the distributed storage system 152 of FIG. 2. The key query can be, for example, associated with a read operation wherein the user (e.g., the application 124) attempts to locate and access/view a piece of data in the distributed storage system 152.

At a block 602 ("RECEIVE KEY ID IN A QUERY"), any one of the storage nodes may receive a query having the key ID. Ideally, any storage node may receive the query, since all storage nodes should have replicas of the data if synchronization is completed and so can respond to the query with the requested data. Moreover, any single storage node may receive and respond to the query, without requiring a quorum of the storage nodes.

In practice, there may be situations where the data is not present in one or more of the storage nodes. For example, the query might specify a wrong key ID, or the synchronization may not yet be complete (and so some storage nodes that receive the query may be missing the data). Hence at a block 604 ("KEY-VALUE ENTRY FOUND LOCALLY?"), the recipient storage node that received the query checks its memory to determine whether the key-value entry is stored locally. If the key-value entry is found ("YES" at the block 604), them the key-value entry is returned to the user, at a block 606 ("RETURN KEY-VALUE ENTRY."

If, however, the key-value entry is not found locally ("NO at the block 604), then the recipient storage node queries other storage nodes (such as neighbor storage nodes) at a block 608 ("SEARCH FOR KEY-VALUE ENTRY AT OTHER STORAGE NODES"). In one embodiment, the recipient storage node may query each of the other storage nodes one-by-one, until the key-value entry is located. In other embodiments, proxy querying may be used, wherein the recipient storage node will first query some other storage node(s), and if those other storage node(s) do not have the key-value entry, then it is those other storage node(s) will query still other storage nodes.

At a block 610 ("KEY-VALUE ENTRY FOUND AT OTHER STORAGE NODE(S)?"), a determination is made by the recipient storage node whether the key-value entry has been located at another storage node. If located ("YES" at the block 610), then the key-value entry is returned to the user at the block 606 by that other storage node, or by the recipient storage node (which would obtain a copy of the key-value entry). If, however, the key-value entry is not found in any of the other storage nodes ("NO" at the block 610), then the recipient storage node that received the user's query will return an error message to the user to indicate that the key-value entry was not found, at a block 612 ("RETURN ERROR: KEY-VALUE ENTRY NOT FOUND").

From at least the foregoing, it is evident that the replication scheme to propagate a key-value entry through the storage nodes in a cluster is easier to implement than a quorum-based consensus algorithm. The methods described herein also provide high availability for storage of M to a maximum number of replicas all of the time, and ideally close to the maximum number of replicas most of the time.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 2 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to store data using the methods for the creation, query, and removal of key-value entries described herein.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to store data in a distributed storage system having storage nodes arranged in a cluster, the method comprising:
   creating, by a coordinator storage node in the cluster, an immutable key-value entry for the data;
   identifying, by the coordinator storage node, neighbor storage nodes in the cluster, wherein the coordinator storage node and the neighbor storage nodes form a set having a minimum number of storage nodes that are required to successfully store the data in the distributed storage system;
   requesting, by the coordinator storage node, the neighbor storage nodes to store the created key-value entry; and
   in response to successfully storing the created key-value entry in the coordinator storage node and in the neighbor storage nodes, sending the created key-value entry to remaining storage nodes in the cluster for storage as replicas.

2. The method of claim 1, wherein the minimum number of storage nodes in the set is less than a quorum of storage nodes in the cluster.

3. The method of claim 1, further comprising in response to unsuccessfully storing the created key-value entry in any one of the coordinator storage node and the neighbor storage nodes:
   indicating the created key-value entry in a removal list; and
   deleting the created key-value entry from whichever of the coordinator storage node and the neighbor storage nodes that successfully stored the created key-value entry.

4. The method of claim 1, further comprising:
   broadcasting a removal list to all of the nodes in the cluster, wherein the removal list contains key identifiers (IDs) of key-value entries that were unsuccessfully stored in the cluster or were replaced by new key-value entries;
   deleting, at each storage node, a local copy of any key-value entry contained in the removal list; and recycling key IDs from the removal list by assigning the key IDs to new data to be stored in the cluster, after verification that the local copy has been deleted from all of the storage nodes in the cluster.

5. The method of claim 1, further comprising:
receiving a query for the key-value entry at a recipient storage node in the cluster;
searching for the key-value entry in the recipient storage node;
in response to failing to locate the key-value entry in the recipient storage node, searching for the key-value entry in other storage nodes in the cluster; and
returning the key-value entry as a response to the query if the key-value entry is located, and returning an error message as the response to the query if there is a failure to locate the key-value entry.

6. The method of claim 1, wherein sending the created key-value entry to the remaining storage nodes in the cluster is performed as an asynchronous replication, and wherein the method further comprises performing a synchronization of the storage nodes in the cluster to compensate for a delay in completion of the asynchronous replication.

7. The method of claim 1, further comprising:
maintaining, by the coordinator storage node, an intention log that identifies tasks that have been completed by the coordinator storage node in connection with coordinating storage of the key-value entry; and
using, by the coordinator storage node, the intention log to identify a next task to perform, after the coordinator storage node experiences a failure.

8. A non-transitory computer-readable medium having instructions stored thereon, which in response to execution by one or more processors, cause the one or more processors to perform or control performance of operations to store data in a distributed storage system having storage nodes arranged in a cluster, the operations comprising:
creating, by a coordinator storage node in the cluster, an immutable key-value entry for the data;
identifying, by the coordinator storage node, neighbor storage nodes in the cluster, wherein the coordinator storage node and the neighbor storage nodes form a set having a minimum number of storage nodes that are required to successfully store the data in the distributed storage system;
requesting, by the coordinator storage node, the neighbor storage nodes to store the created key-value entry; and
in response to successfully storing the created key-value entry in the coordinator storage node and in the neighbor storage nodes, sending the created key-value entry to remaining storage nodes in the cluster for storage as replicas.

9. The non-transitory computer-readable medium of claim 8, wherein the minimum number of storage nodes in the set is less than a quorum of storage nodes in the cluster.

10. The non-transitory computer-readable medium of claim 8, wherein the operations further comprise in response to unsuccessfully storing the created key-value entry in any one of the coordinator storage node and the neighbor storage nodes:
indicating the created key-value entry in a removal list; and
deleting the created key-value entry from whichever of the coordinator storage node and the neighbor storage nodes that successfully stored the created key-value entry.

11. The non-transitory computer-readable medium of claim 8, wherein the operations further comprise:
broadcasting a removal list to all of the nodes in the cluster, wherein the removal list contains key identifiers (IDs) of key-value entries that were unsuccessfully stored in the cluster or were replaced by new key-value entries;
deleting, at each storage node, a local copy of any key-value entry contained in the removal list; and
recycling key IDs from the removal list by assigning the key IDs to new data to be stored in the cluster, after verification that the local copy has been deleted from all of the storage nodes in the cluster.

12. The non-transitory computer-readable medium of claim 8, wherein the operations further comprise:
detecting a query for the key-value entry at a recipient storage node in the cluster;
searching for the key-value entry in the recipient storage node;
in response to failing to locate the key-value entry in the recipient storage node, searching for the key-value entry in other storage nodes in the cluster; and
returning the key-value entry as a response to the query if the key-value entry is located, and returning an error message as the response to the query if there is a failure to locate the key-value entry.

13. The non-transitory computer-readable medium of claim 8, wherein sending the created key-value entry to the remaining storage nodes in the cluster is performed as an asynchronous replication, and wherein the operations further comprise performing a synchronization of the storage nodes in the cluster to compensate for a delay in completion of the asynchronous replication.

14. The non-transitory computer-readable medium of claim 8, wherein the operations further comprise:
maintaining, by the coordinator storage node, an intention log that identifies tasks that have been completed by the coordinator storage node in connection with coordinating storage of the key-value entry; and
using, by the coordinator storage node, the intention log to identify a next task to perform, after the coordinator storage node experiences a failure.

15. A distributed storage system to store data, the distributed storage system comprising:
storage nodes arranged in cluster; and
a coordinator storage node, among the storage nodes in the cluster, configured to:
create an immutable key-value entry for the data;
identify neighbor storage nodes in the cluster, wherein the coordinator storage node and the neighbor storage nodes form a set having a minimum number of storage nodes that are required to successfully store the data in the distributed storage system;
request the neighbor storage nodes to store the created key-value entry; and
in response to successfully storage of the created key-value entry in the coordinator storage node and in the neighbor storage nodes, send the created key-value entry to remaining storage nodes in the cluster for storage as replicas.

16. The distributed storage system of claim 15, wherein the minimum number of storage nodes in the set is less than a quorum of storage nodes in the cluster.

17. The distributed storage system of claim 15, wherein the coordinator storage node is further configured to, in response to unsuccessful storage of the created key-value entry in any one of the coordinator storage node and the neighbor storage nodes:
indicate the created key-value entry in a removal list; and initiate deletion of the created key-value entry from whichever of the coordinator storage node and the neighbor storage nodes that successfully stored the created key-value entry.

18. The distributed storage system of claim 15, wherein:
the coordinator storage node is further configured to broadcast a removal list to all of the nodes in the cluster, wherein the removal list contains key identifiers (IDs) of key-value entries that were unsuccessfully stored in the cluster or were replaced by new key-value entries;
each storage node is configured to delete a local copy of any key-value entry contained in the removal list; and
the distributed storage system is coupled to a management server that is configured to recycle the key IDs from the removal list by assigning the key IDs to new data to be stored in the cluster, after verification by the management server that the local copy has been deleted from all of the storage nodes in the cluster.

19. The distributed storage system of claim 15, wherein each of the storage nodes in the cluster is configured to:
receive a query for the key-value entry as a recipient storage node in the cluster;
search for the key-value entry in the recipient storage node;
in response to a failure to locate the key-value entry in the recipient storage node, search for the key-value entry in other storage nodes in the cluster; and
return the key-value entry as a response to the query if the key-value entry is located, and return an error message as the response to the query if there is a failure to locate the key-value entry.

20. The distributed storage system of claim 15, the coordinator storage node is configured to send the created key-value entry to the remaining storage nodes in the cluster by performance of an asynchronous replication, and wherein any of the storage nodes in the cluster is configured to operate as a master storage node to perform a synchronization of the storage nodes in the cluster to compensate for a delay in completion of the asynchronous replication.

21. The distributed storage system of claim 15, wherein the coordinator storage node is further configured to:
maintain an intention log that identifies tasks that have been completed by the coordinator storage node in connection with coordinating storage of the key-value entry; and
use the intention log to identify a next task to perform, after the coordinator storage node experiences a failure.

* * * * *